United States Patent   [10] Patent No.: US 7,445,031 B2
Hummel et al.                (45) Date of Patent:   Nov. 4, 2008

(54) INSULATION ARRANGEMENT FOR PIPES, IN PARTICULAR FOR PIPES IN A PNEUMATIC SYSTEM ON A PASSENGER AIRCRAFT

(75) Inventors: Gerhard Hummel, Hamburg (DE); Horst-Dieter Rohwedder, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/549,984

(22) PCT Filed: Mar. 19, 2004

(86) PCT No.: PCT/DE2004/000579

§ 371 (c)(1),
(2), (4) Date: Sep. 19, 2005

(87) PCT Pub. No.: WO2004/083712

PCT Pub. Date: Sep. 30, 2004

(65) Prior Publication Data
US 2006/0180227 A1    Aug. 17, 2006

(30) Foreign Application Priority Data
Mar. 22, 2003 (DE) .................. 103 12 871

(51) Int. Cl.
*F16L 9/14* (2006.01)

(52) U.S. Cl. .................. 138/149; 138/152; 138/153; 138/163; 138/167; 138/170

(58) Field of Classification Search .................. 138/149, 138/152, 153, 170, 163, 167
See application file for complete search history.

(56) References Cited

U.S. PATENT DOCUMENTS

| 1,691,783 | A | * | 11/1928 | Mottweiler et al. | 138/147 |
| 2,576,698 | A | * | 11/1951 | Russum | 428/75 |
| 2,919,721 | A | * | 1/1960 | Isenberg | 138/109 |
| 3,030,250 | A | * | 4/1962 | Losse | 138/149 |
| 3,530,899 | A | * | 9/1970 | Breeding | 138/107 |
| 3,541,539 | A |   | 11/1970 | Trumble | |
| 3,628,572 | A | * | 12/1971 | Shannon | 138/161 |
| 3,904,379 | A |   | 9/1975 | Oser et al. | |
| 3,911,961 | A |   | 10/1975 | Peyton et al. | |
| 3,916,955 | A |   | 11/1975 | Netterstedt et al. | |
| 4,162,093 | A | * | 7/1979 | Sigmund | 285/47 |
| 4,182,379 | A | * | 1/1980 | Lestak et al. | 138/149 |
| 4,287,011 | A |   | 9/1981 | Derbyshire | |
| 4,287,245 | A | * | 9/1981 | Kikuchi | 428/34.2 |
| 4,576,661 | A |   | 3/1986 | Persson | |
| 4,677,731 | A | * | 7/1987 | Sommerer et al. | 29/525.12 |
| 4,735,235 | A | * | 4/1988 | Anderson et al. | 138/109 |
| 4,996,088 | A | * | 2/1991 | Knittel et al. | 428/40.9 |
| 2003/0236043 | A1 | * | 12/2003 | Calzavara et al. | 442/79 |
| 2004/0091678 | A1 | * | 5/2004 | Jordan | 428/192 |
| 2006/0054235 | A1 | * | 3/2006 | Cohen et al. | 138/149 |

FOREIGN PATENT DOCUMENTS

GB    797 208    6/1958

* cited by examiner

*Primary Examiner*—James F Hook
(74) *Attorney, Agent, or Firm*—W. F. Fasse; W. G. Fasse

(57) ABSTRACT

An insulation arrangement for pipes, especially for pipes of a pneumatic system in a passenger transport aircraft, essentially includes at least one insulation layer (6) as well as an outer sheath (3) consisting of titanium foil (31). The outer sheath (3) is connected, in a first end section (32) and in a second end section (33), respectively with a termination profile (7), and thereby a shell (9) with at least one longitudinal seam (13) is formed, into which the insulation layer (6) is insertable.

22 Claims, 3 Drawing Sheets

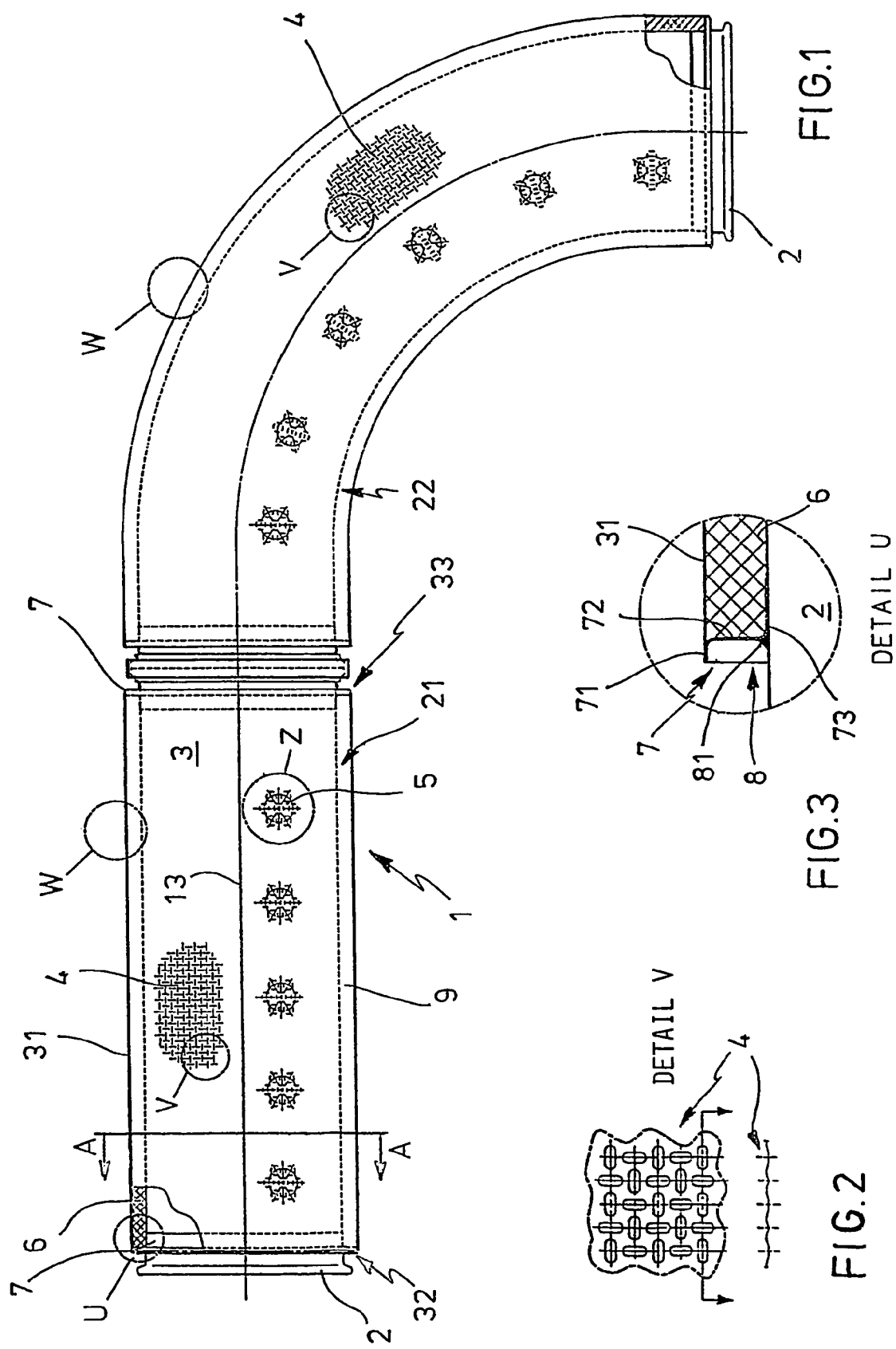

INSULATION ARRANGEMENT FOR PIPES, IN PARTICULAR FOR PIPES IN A PNEUMATIC SYSTEM ON A PASSENGER AIRCRAFT

TITLE OF THE INVENTION

FIELD OF THE INVENTION

The invention relates to an insulation arrangement for pipes, especially for pipes of a pneumatic system in a passenger transport aircraft.

BACKGROUND INFORMATION

Due to the high temperatures of up to 260° C., it is necessary to carry out a heat insulation for pneumatic pipes in a passenger transport aircraft, and to protect structural components of the aircraft against the high temperatures. In Airbus aircraft, titanium foils with a thickness of approximately 0.1 mm are used for such insulations, as an outer sleeve or sheath enclosing two layers of fiberglass wool with a thickness of respectively one inch. Z-profiles are welded onto the ends of the corresponding pipe, whereby these Z-profiles on the one hand form the longitudinal boundary for the fiberglass wool layers and on the other hand serve as a carrier for the titanium outer sheath. The titanium outer sheath is welded onto the Z-profile. Such a pipe installation is costly and complicated in handling, because, among other things, before the welding of the titanium outer sheath, two plies of insulation layer must be applied onto the pipe and thereafter the titanium foil is welded onto the Z-profile. Such an insulation arrangement is also no longer removable from the pipe. If damages should arise on the insulation, for example through mechanical influences, which cause a denting or tearing of the insulation, a repair is not possible and a costly exchange of the entire pipe must be taken into consideration.

SUMMARY OF THE INVENTION

It is thus the underlying object of the present invention to provide a pipe insulation of the above mentioned general type, which is suitable for use on pneumatic pipes for passenger transport aircraft in a lightweight and temperature resistant construction, and which is not costly or complicated to install, but rather is economical and easy to install and to remove for repair of small damages on the outer sheath.

The above object has been achieved in an insulation arrangement according to the invention, whereby it is especially advantageous that such an insulation arrangement is easily producible in a pre-assembly, and an installation on the pneumatic pipeline system can be carried out quickly and in an uncomplicated manner. The lightweight and temperature resistant embodimentofthe insulation arrangement enables the application in the pneumatic system of an aircraft. With the provided shell technology, the insulation can be separately disassembled and removed, and if necessary, damaged insulation parts can be exchanged in an economical and uncomplicated manner.

The insulation arrangement according to particular detailed embodiments using a full shell or a half shell, or using a Z-profile as the termination profile, respectively exhibits a simple possibility of realizing a shell technology in which the insulation material can be inserted.

With the measures according to further embodiments using adhesive bonding or welding or a form-locking connection of the longitudinal seam, a preferred and secure possibility of the closing of the longitudinal seam is provided.

The measure according to another embodiment using a profiled or patterned titanium foil is provided for achieving a lightweight construction, with which the strength of the outer sheath being used can be increased.

Advantageous measures for ensuring a monitoring system against leaks in the pipeline system are given by embodiments including outlet holes in the outer sheath, warning wires arranged above the holes, and an antirotation securement of the shell.

Especially in connection with long or curved pipe sections, the insertion of strengthening or stiffening elements according to another embodiment is advantageous, in order to achieve a sufficient stability of the insulation arrangement.

Further details and advantages arise from the following description of example embodiments of the invention.

BRIEF DESCRIPTION OF THE DRAWINGS

Example embodiments of the invention are illustrated in the drawing, and are described in further detail in the following with reference to the FIGS. 1 to 7. In the Figures, the same components are provided with the same reference numbers.

In detail, it is shown by:

FIG. 1 an insulation arrangement according to the invention for pneumatic pipes in a top plan view, FIG. 2 an enlarged detail illustration of the surface of the outer sheath of the pipe insulation, FIG. 3 a detail illustration of the connection or junction between Z-profile and titanium foil provided on the insulation arrangement, FIG. 4 a cross section through a pneumatic pipe with the inventive insulation arrangement according to section AA of FIG. 1, FIG. 5A,B detail illustrations in the area of a longitudinal seam of the insulation arrangement, FIG. 6A,B a detail illustration with an enlarged sectional illustration of the outlet holes provided in the insulation arrangement, and FIG. 7A,B,C embodiments of stiffening elements within the insulation arrangement.

DETAILED DESCRIPTION OF EXAMPLE EMBODIMENTS OF THE INVENTION

Figure 4:
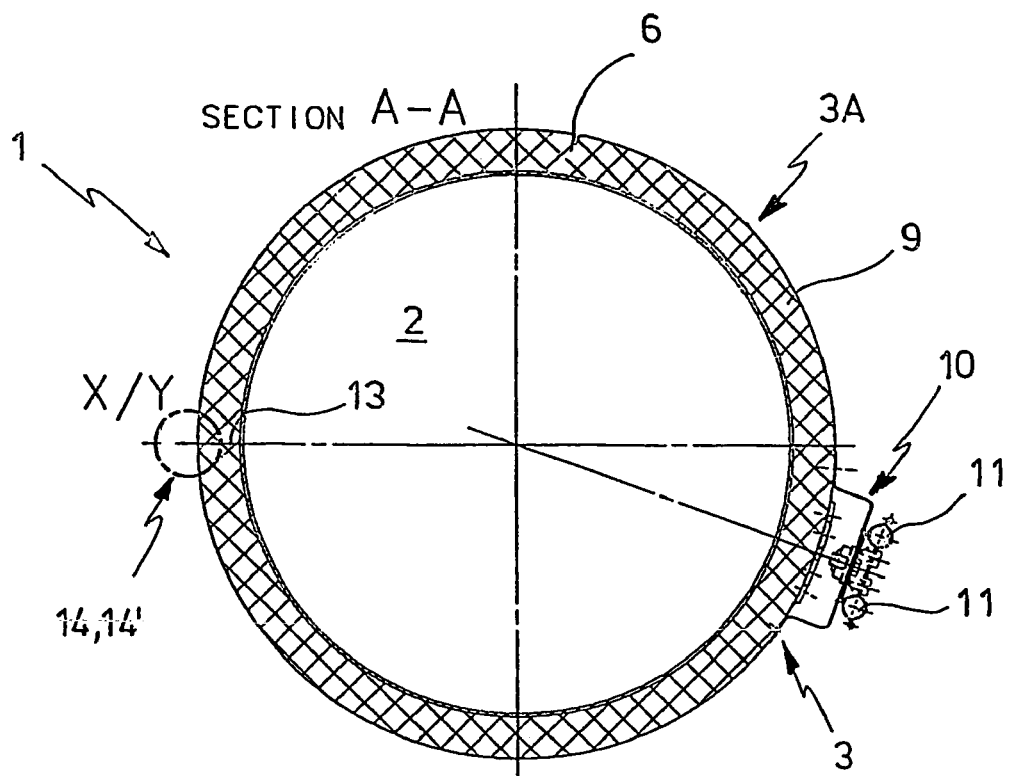

An insulation arrangement 1 for pipes 2 can be seen in FIG. 1. The pipes 2 are preferably provided as pneumatic pipes in a passenger transport aircraft and are thermally insulated with insulation layers 6 preferably consisting of fiberglass wool, due to the arising high temperatures of an airstream up to 260° C. in the interior of the pipe. Thereby, the surrounding aircraft structure is protected against a too-high heat radiation of the pipes 2. It is an essential requirement for the insulation arrangement 1 to be carried out in a lightweight manner of construction. Thus, a titanium foil 31 with a thickness of approximately 0.1 mm is used as an outer sleeve or sheath 3 of the insulation. In FIG. 2 it is shown that the titanium foil 31 comprises a profiled or patterned configuration 4 in order to increase the stiffness of the outer sheath.

Visible in FIG. 1 are two pipe sections 21 and 22, whereby the pipe section 22 is embodied curved. The pipe sections 21, 22 and further pipe sections not shown are joined together to form a pneumatic pipeline system, preferably by means of flange connections or joints. After the installation of the pipe sections 21, 22, the insulation arrangement 1 is mounted or installed on the pipe 2. The insulation arrangement 1 is preferably embodied as a shell, whereby a half shell (not shown) or a full shell 9 can be provided. The full shell 9 comprises a longitudinal seam 13 in the titanium outer sheath 3; for a half shell, two longitudinal seams would be necessary. The titanium foil 31 comprises dimensions corresponding to the circumference of the necessary outer sheath 3 for the shell 9 of a pipe section 21 or 22. In a first method step, the end sections 32 and 33 are connected with a Z-profile 7 (see detail illustration in FIG. 3). Also other typical profile shapes are utilizable. The titanium foil 31 is welded onto the upper web or leg 71 of the Z-profile 7. Due to the Z-shape of the termination profile 7, a receiver for an insulation layer 6 is formed with the middle leg or web 72 and the lower leg or web 73. Fiberglass wool is preferably used as the insulation material. After the completion of the connections or joints between the Z-profile 7 on the respective end section 32 and 33, the insulation layer 6 can be inserted in or laid into the formed shell 9. If it is necessary, the insulation layer 6 can be secured or fixed on the inner side of the titanium foil 31 with a temperature resistant adhesive. The thusly pre-assembled shell 9 is now ready for the installation on the pneumatic pipe 2, and, by opening the longitudinal seam 13, is pushed or slipped over the pipe 2, and is closed in the area of the longitudinal seam by welding or adhesive bonding or gluing. Thereby, the installation effort on location can be considerably reduced, and the installation can be simplified. The closing of the longitudinal seam 13 is explained in the subsequent following FIGS. 4 and 5.

Figures 5A, 5B:
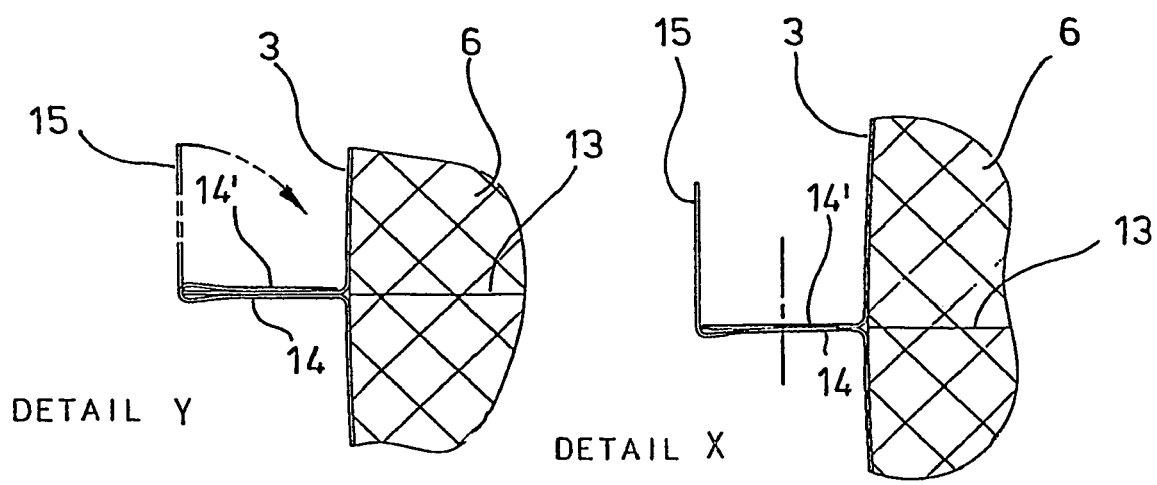

A cross section of an insulation arrangement 1 in the embodiment as a full shell 9 is shown in FIG. 4. The cross section corresponds to the section A-A from FIG. 1. The full shell 9 is opened and closed in the area of the longitudinal seam 13. The area of the longitudinal seam 13 is shown as a detail in FIG. 5. In FIG. 5A it can be seen that joint webs 14 and 14' are arranged on the butting-together longitudinal seam 13 on the outer sheath 3, which joint webs serve for the closing of the longitudinal seam 13. The joint webs 14, 14' are connected by gluing or adhesive bonding, pulse welding, or other welding methods, and according to FIG. 5B a securing web 15 can finally be bent according to the arrow direction as a form-locking connection and thereby additionally secure the two joint webs 14, 14' against opening.

It is furthermore visible in FIG. 1 in connection with FIG. 4, that warning wires 11 of a monitoring system, a so-called "Overheat Detection System" against possible leaks in the pneumatic pipeline system, are secured on the titanium outer sheath 3 by means of mounting brackets 10. The mounting brackets 10 are preferably welded onto the titanium outer sheath 3. The warning wires 11 extend along the pneumatic pipe 2 and are positioned above outlet holes 5. The arrangement of the outlet holes 5 in the titanium foil 31 is shown as a detail in FIG. 6.

Figure 6A:
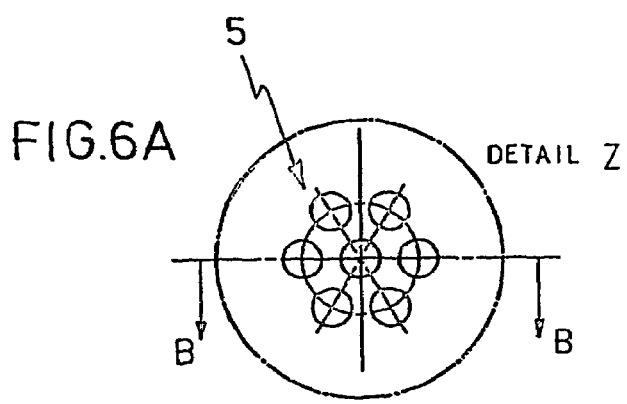
Figure 6B:
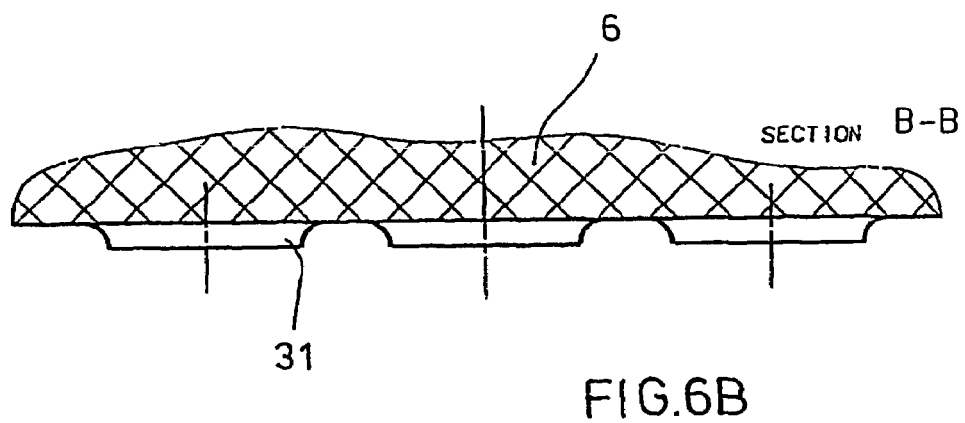

FIG. 6A shows a top plan view onto the titanium outer sheath 3 in the area of the outlet holes, in FIG. 6B a cross section is visible in a sectional view, which shows the titanium foil 31 with the outlet holes 5. In the event of a possible leak, hot air flows through the insulation layer 6 into the outlet holes 5 that are closest to the leak. The warning wires positioned above the outlet holes 5 become hot, and upon overheating emit a signal, whereby the position of an arising leak can be exactly detected.

In order to guarantee the functionality of the monitoring system, it must be ensured that the warning wires 11 are respectively positioned directly above the outlet holes 5. For that it can be necessary to provide an anti-rotation securement 8 between the pneumatic pipe 2 and the shell 9, because otherwise the insulation arrangement 1 can be freely moved on the pipe 2. In the detail illustration of FIG. 3, it is shown that such a connection is realized by means of a fillet joint seam 81 of a temperature resistant adhesive or a paste between the Z-profile 7 in the end region 32 or 33 of a titanium sheath 3 and the pipe 2. The fillet joint seams 81 can be approximately 50 mm long and can be placed at several locations of the circumference between the Z-profile 7 and the pipe 2.

If now an exchange of the insulation 1 becomes necessary, for example in the event of possible damages of the titanium foil 31, the anti-rotation securement 8 is to be released and the longitudinal seam 13 is to be opened. The insulation 1 can be removed from the corresponding pipe section 21 or 22 in an uncomplicated economical manner and can be replaced with an exchange or replacement part. After the closing of the longitudinal seam of the replacement insulation, the repair is finished, and if necessary a new fillet joint seam 81 is applied as an anti-rotation securement 8 between the titanium outer sheath 3 and the pipe 2.

Figure 7A:
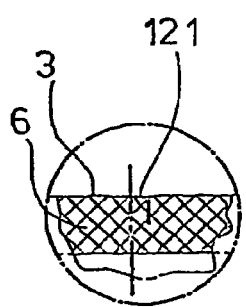
Figure 7B:
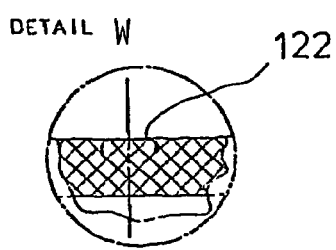
Figure 7C:
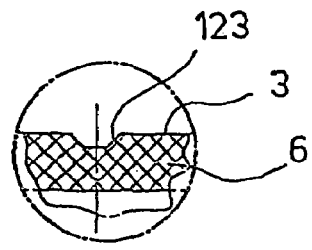

Embodiments of stiffening elements are shown in Fig. 7, which stiffening elements can be used for reinforcement or strengthening of the titanium outer sheath 3, especially in connection with longer pipe sections 21 or in curved pipe sections 22. Such stiffening elements can be embodied preferably as L-profiles 121 (see FIG. 7A), as U-profiles 122 (see FIG. 7B) or also as corrugations or beads 123 (see FIG. 7C). They are welded onto the inner side of the titanium sheath 3 or inserted into the foil 31. It is provided to use such stiffening elements partially as needed.

The invention claimed is:

1. Insulation arrangement for a pipe, especially for a pipe of a pneumatic system in a passenger transport aircraft, comprising an insulation material layer (6) and a pre-fabricated shell (9) that includes an outer sheath consisting of titanium foil (31), and first and second termination profile elements, wherein the outer sheath (3) has a first end section (32) and a second end section (33), and the outer sheath is connected at the first and second end sections respectively with the first and second termination profile elements, and wherein the shell (19) has at least one longitudinal seam (13), and is adapted to and does receive therein the insulation material layer (6) and is adapted to be mounted on the pipe with the longitudinal seam of the shell open, and with the insulation material layer (6) received in the shell, and further comprising closure parts (14, 14') that are provided on the shell at the at least one longitudinal seam (13) and that are adapted to close the at least one longitudinal seam (13) after the shell is mounted on the pipe, and wherein the titanium foil (31) forming the outer sheath (3) has a profiled or patterned surface configuration.

2. Insulation arrangement according to claim 1, characterized in that each said termination profile element (7) is embodied as a Z-profile element, including an upper web (71) connected with the titanium foil (31), and a middle web (72) as well as a lower web (73) that form a receiver receiving the insulation material layer (6).

3. Insulation arrangement according to claim 1, characterized in that the shell (9) is embodied as a full shell including only a single one of the longitudinal seam, and the shell is opened at the longitudinal seam (13) and slipped over the pipe (2), and is closed by the closure parts which comprise joint webs (14, 14') provided on the longitudinal seam (13).

4. Insulation arrangement according to claim 3, characterized in that the joint webs (14, 14') are joined together by adhesive bonding or welding to close the longitudinal seam.

5. Insulation arrangement according to claim 1, characterized in that the shell (9) comprises two half shells, joined along two of said longitudinal seams, and the two half shells are positioned on the pipe (2), and are closed by the closures parts which comprise joint webs (14, 14') provided on the longitudinal seams.

6. Insulation arrangement according to claim 5, characterized in that the joint webs (14, 14') are joined together by adhesive bonding or welding to close the two longitudinal seams.

7. Insulation arrangement according to claim 1, characterized in that the closure parts comprise a securing web (15) that is provided along the longitudinal seam and that is configured to produce a form-locking secured connection.

8. Insulation arrangement according to claim 1, further comprising stiffening elements (12) that are at least partially applied onto the inner side of the titanium foil (31).

9. Insulation arrangement for a pipe of a pneumatic system in a passenger transport aircraft, which essentially comprises at least one insulation layer (6), an outer sheath consisting of titanium foil (31), and first and second termination profiles, wherein the outer sheath (3) has at least one longitudinal seam (13) and a first end section (32) and a second end section (33), and said outer sheath is connected at said first and second end sections respectively with said first and second termination profiles, whereby said outer sheath and said termination profiles connected thereto form a shell (9) into which the insulation layer (6) is insertable, wherein the outer sheath (3) comprises outlet holes (5), warning wires (11) are arranged above the outlet holes (5), and an anti-rotation securement (8) is provided, which prevents a position change between the pipe (2) and the shell (9)

10. Insulating arrangement according to claim 9, characterized in that the anti-rotation securement (8) is a partial adhesive connection, as a fillet joint seam (81) of a temperature resistant adhesive or a paste between the termination profile (7) and the pipe (2).

11. A pre-fabricated insulation arrangement for thermally insulating a pipe, said insulation arrangement comprising:
   a shell that comprises:
      a cylindrical outer sheath comprising a titanium foil, and having a first end section and a second end section at opposite first and second ends of said outer sheath in a longitudinal direction;
      a metal first termination profile element positioned within and connected to said first end section of said outer sheath and extending radially inwardly from said outer sheath; and
      a metal second termination profile element positioned within and connected to said second end section of said outer sheath and extending radially inwardly from said outer sheath;
      wherein said first and second termination profile elements are spaced apart from one another in said longitudinal direction; and
      wherein said shell has a longitudinal seam extending therealong in said longitudinal direction, and further comprises closure parts that are provided at said longitudinal seam and that are adapted to be secured together so as to close said longitudinal seam; and
   at least one layer of thermal insulation material inserted into said shell through said longitudinal seam of said shell to form a cylindrical annular insulation material jacket adapted to surround the pipe, wherein said cylindrical annular insulation material jacket is received and held by said termination profile elements in a cylindrical annular shell space bounded longitudinally between said termination profile elements and bounded radially inside said outer sheath;
   wherein said pre-fabricated insulation arrangement including said cylindrical annular insulation material jacket arranged in said cylindrical annular shell space inside said shell exists as a pre-fabricated pre-assembled component separate from the pipe and without the pipe yet received therein, and wherein said shell with said cylindrical annular insulation material jacket therein is adapted to be mounted on the pipe via said longitudinal seam which is open.

12. The insulation arrangement according to claim 11, wherein each said termination profile element includes an outer web extending along and connected to said outer sheath at a respective one of said end sections, a middle web extending radially inwardly from said outer web along a radial plane transverse to said longitudinal direction, and an inner web extending in said longitudinal direction from a radially inner end of said middle web. whereby said cylindrical shell space is defined radially between said inner web and said outer sheath, and said inner web serves to hold said cylindrical annular insulation material jacket in said cylindrical shell space.

13. The insulation arrangement according to claim 11, wherein said termination profile elements are connected to said outer sheath by respective weld joints.

14. The insulation arrangement according to claim 11, wherein said termination profile elements are not connected to the pipe.

15. The insulation arrangement according to claim 11, further comprising an adhesive joint connecting said termination profile elements to the pipe.

16. The insulation arrangement according to claim 11, wherein said thermal insulation material is fiberglass wool.

17. A method of assembling and installing the insulation arrangement according to claim 11, for thermally insulating the pipe, said method comprising the steps:
   a) providing said shell including said outer sheath and said termination profile elements connected thereto;
   with said longitudinal seam open, inserting said insulation material through said longitudinal seam into said cylindrical annular shell space within said shell to complete assembly of said pre-fabricated pre-assembled component;
   c) then after said step b), with said longitudinal seam open, mounting said pre-fabricated pre-assembled component onto said pipe by passing said pipe through said longitudinal seam; and
   d) after said step c), closing said longitudinal seam To complete installation of said pre-fabricated pre-assembled component on said pipe.

18. The insulation arrangement according to claim 11, wherein said closure parts include first and second closure parts that respectively extend continuously longitudinally along first and second edges of said outer sheath bounding said longitudinal seam.

19. The insulation arrangement according to claim 18, wherein said first and second closure parts comprise respective first and second flange webs of said titanium foil protruding outwardly from said cylindrical outer sheath and longitudinally along said longitudinal seam.

20. The insulation arrangement according to claim 19, wherein said first and second flange webs are so configured and arranged that said second flange web is wider than said first flange web and can be bent and folded over said first flange web so as to engage said first flange web with said second flange web.

21. The insulation arrangement according to claim 11, wherein said titanium foil of said outer sheath has a patterned surface configuration.

22. The insulation arrangement according to claim 21, wherein said patterned surface configuration has a weave pattern as seen in a plan view and a surface undulation pattern as seen in a sectional view.

* * * * *

UNITED STATES PATENT AND TRADEMARK OFFICE
CERTIFICATE OF CORRECTION

PATENT NO. : 7,445,031 B2  Page 1 of 1
APPLICATION NO. : 10/549984
DATED : November 4, 2008
INVENTOR(S) : Hummel et al.

It is certified that error appears in the above-identified patent and that said Letters Patent is hereby corrected as shown below:

Title page,
Item [75], Inventors,
Line 1, after "Hummel,", replace "Hamburg" by --Bremen--;
Line 2, after "Rohwedder,", replace "Hamburg" by --Stuhr--;

Column 1,
Line 8, delete "TITLE OF THE INVENTION" and move the same up to above line 1;
Line 52, after "resistant", replace "embodimentofthe" by --embodiment of the--;

Column 2,
Line 6, after "and an", replace "antirotation" by --anti-rotation--;

Column 5,
Lines 15 and 16, after "holes", replace "(5) ," by --(5),--;
Line 19, after "10.", replace "Insulating" by --Insulation--;
Line 46, after "seam;", insert a paragraph break;
Line 60, after "without the pipe", replace "vet" by --yet--;

Column 6,
Line 8, after "middle", replace "web." by --web,--;
Line 25, after "claim 11", delete ",";
Line 29, before "with", insert --b)--;
Line 38, after "seam", replace "To" by --to--.

Signed and Sealed this

Twenty-second Day of June, 2010

David J. Kappos
*Director of the United States Patent and Trademark Office*